UNITED STATES PATENT OFFICE.

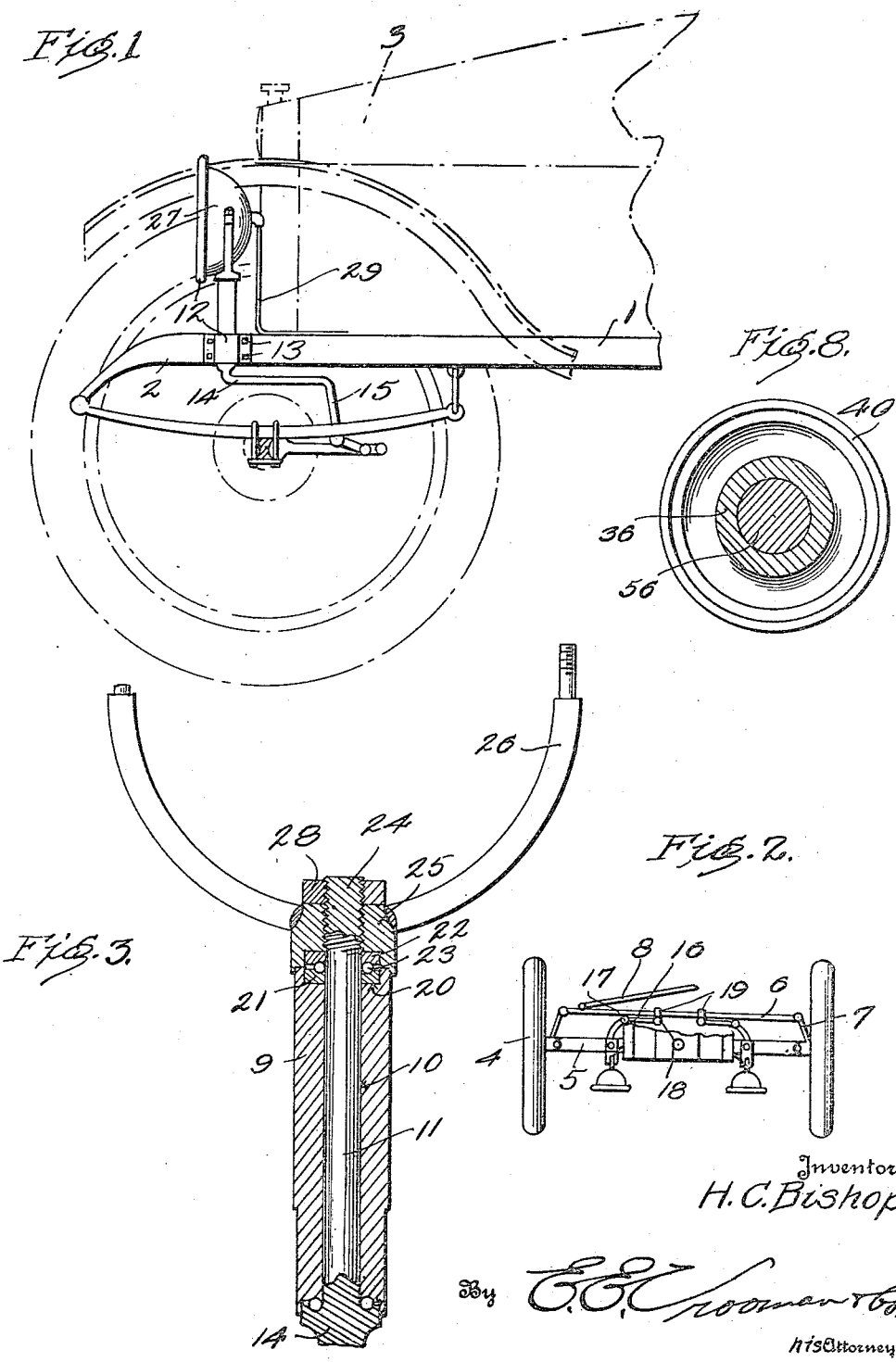

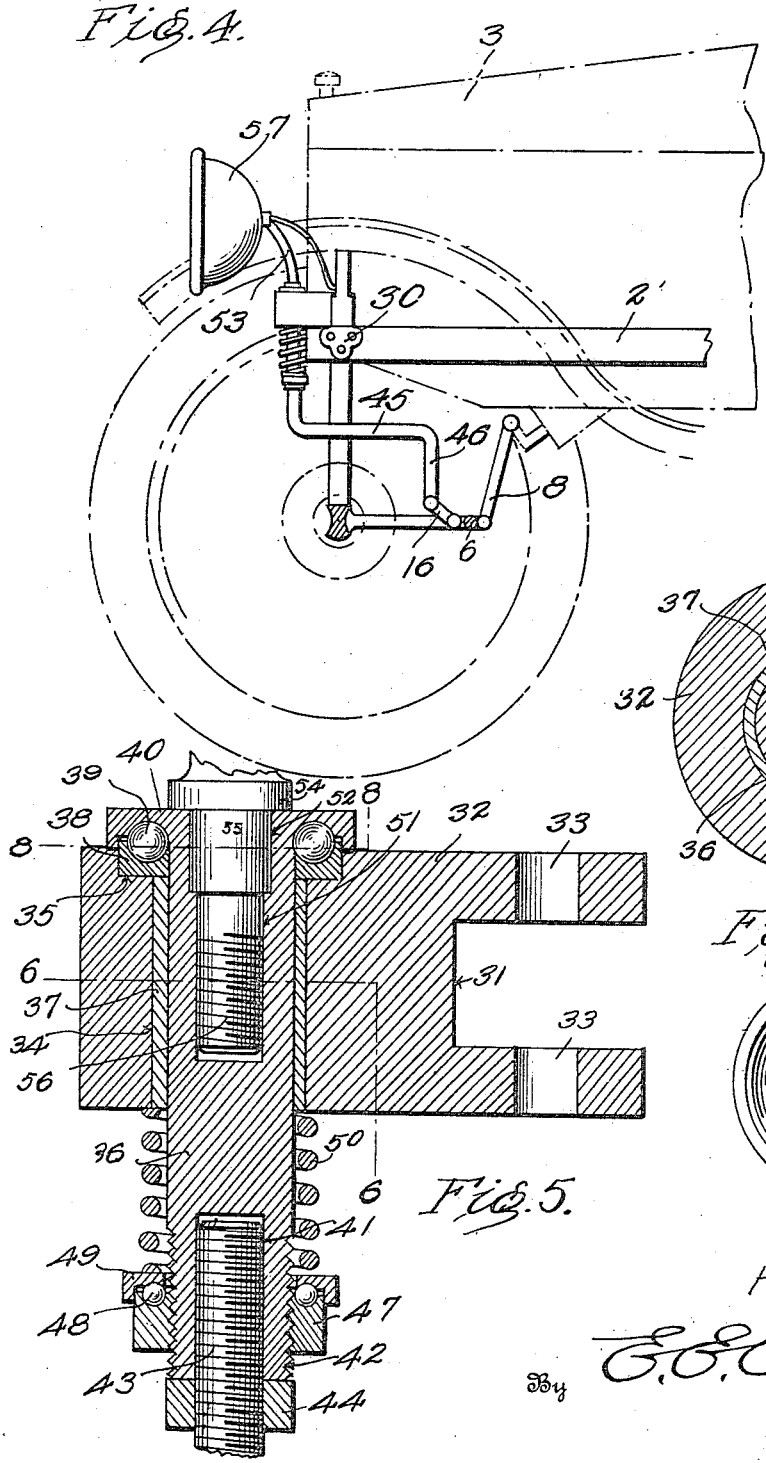

HUGH C. BISHOP, OF SHELDON, MISSOURI, ASSIGNOR OF ONE-HALF TO ANDREW J. OOLEY, OF VERNON COUNTY, MISSOURI.

HEADLIGHT FOR AUTOMOBILES.

1,245,140.  Specification of Letters Patent.  Patented Oct. 30, 1917.

Application filed April 16, 1917. Serial No. 162,480.

*To all whom it may concern:*

Be it known that I, HUGH C. BISHOP, a citizen of the United States of America, residing at Sheldon, in the county of Vernon and State of Missouri, have invented certain new and useful Improvements in Headlights for Automobiles, of which the following is a specification, reference being had therein to the accompanying drawing.

This invention relates to head lights for automobiles and has special reference to a dirigible head light for vehicles.

One object of this invention is the provision of a dirigible head light for vehicles wherein simple and efficient means is provided for automatically turning the lamps to project the rays of light extending therefrom in the path of travel of the vehicle.

Another object of this invention is the provision of a supporting post for each lamp which is constructed so as to effectually support the lamp and at the same time permit the same to be automatically turned.

Another object of this invention is the provision of a dirigible head light for vehicles wherein the post for supporting the lamp is provided with a yieldable retaining means which normally retains the lamp in a set position, which will yield when undue stress is brought to bear upon the lamp thereby relieving the lamp from strain when the vehicle is passing over an uneven surface, the lamp being free to automatically turn at all times.

With these and other objects in view the invention consists of certain novel combinations, constructions and arrangements of parts as will be hereinafter fully described and claimed.

In the drawings:—

Figure 1 is a side elevation of the head light for automobiles showing the same in use and constructed in accordance with this invention;

Fig. 2 is a reduced top plan view of the head light for automobiles showing the same upon the running gear of the automobile;

Fig. 3 is a central vertical section partly in elevation of the supporting post of one of the lamps;

Fig. 4 is a side elevation of a slightly modified form of the head light for automobiles;

Fig. 5 is a central vertical section through the lamp supporting post used in this modified form;

Fig. 6 is a transverse section through the device taken on the line 6—6 of Fig. 5;

Fig. 7 is a plan view of the interior of a certain retaining cap used in connection with this modified form;

Fig. 8 is a transverse section taken on the line 8—8 of Fig. 5.

Referring to the accompanying drawings by numerals it will be seen that the head light for automobiles is adapted to be used in connection with an ordinary automobile 1 which has the usual side beams 2 and hood 3. The wheels 4 are pivotally connected to the axle 5 of the automobile 1 and are turned by means of the rod 6 engaging knuckles 7 which is shifted by the usual steering link 8.

The supporting post 9 is elongated as illustrated clearly in Fig. 3 and is provided with a central bore 10 extending vertically therethrough. This bore 10 is cylindrical so as to permit the stem 11 to project therethrough. It will be noted that the post 9 is secured by a clamp 12 which fits therearound as shown in Fig. 1 while the clamp 12 is fixedly mounted upon one of said beams 2 by means of the usual bolts or machine screws 13. The stem 11 is provided with an arm 14 formed integrally upon its lower end and this arm 14 projects for a distance in a horizontal plane and then terminates in a depending portion 15. This depending portion 15 is provided with a finger 16 connected by the usual ball and socket connection 17 while the opposite end of this finger 16 is connected by the ball and socket connection 18 to the clamp 19 mounted upon the rod 6. Therefore it will be seen that as the rod 6 is shifted in either direction by means of the link 8 for causing the knuckles 7 to be turned for swinging the arm 14 in the same direction the wheels are being turned thereby turning the stem 11 in the same direction.

An annular internal socket 20 is formed within the upper end of the post 9 as shown clearly in Fig. 3 so as to receive the ring 21. A like ring 22 is positioned above the ring 21 so as to permit the bearing balls 23 to be interposed between the rings 21 and 22 for forming a supporting connection having the least amount of friction. The externally threaded neck 24 projects from the upper end of the stem 11 and extends through the cap 25 formed upon the yoke 26 which carries the lamp 27. This cap 25 is held against accidental displacement by means of the locking nut 28 which is carried upon the projecting end of the externally threaded neck 24 and bears upon the upper end of the cap 25. It will be noted that this cap 25 projects over the upper collar 22 and also over the upper end of the post 9. When the stem 11 is turned in either direction in a manner hereinbefore specified it is obvious that the rotary motion of the externally threaded neck 24 will cause rotary motion to be imparted to the cap 25 and this motion will be in turn imparted to direct the rays of light in the path of travel of the vehicle.

The wire 29 is carried in any suitable manner upon the bolted end of the hood 3 and this wire 29 extends into the lamp 27. This wire 29 should of course be capable of moving freely without binding upon or interfering with the swinging of the lamp and furthermore to prevent the accidental breaking or undue wear upon the wire 29.

By referring to Figs. 4 to 8 inclusive illustrating the modified form it will be seen that the automobile is provided with the same steering and supporting connections and arrangements as illustrated in the preferred form. In this form of the invention however a bracket 30 is fixedly mounted upon one of the side beams 2' and this bracket 30 projects through the bifurcated end 31 of the supporting block 32. This end is provided with alined openings 33 through which suitable securing means may be passed into engagement with the bracket 30 as the same projects through this end thereby fixedly retaining the supporting block 32 upon the forward end of the beam 2' as shown clearly in Fig. 4. This supporting block 32 is provided with a central vertical opening 34 projecting therethrough while an annular socket 35 is formed connected with the upper surface of the supporting block 32 and in the opening 34 adjacent this upper end.

The lamp post 36 extends through the lining sleeve 37 which fits within the opening 34 formed in the supporting block 32 as shown clearly in Fig. 5. This lining sleeve 37 extends from a point adjacent the socket 35 to the lower surface of the supporting block 32. It will be noted that the bearing ball ring 38 fits within the socket 35 so as to carry the usual bearing balls 39 while the cap 40 formed integral upon the lamp post 36 bears upon the balls 39 and overhangs the outer side surface or periphery of the ring 38. It is therefore obvious that the weight imparted to the supporting post 36 will be taken up by the balls 39 and imparted by the balls 39 through the ring 38 to the supporting block 33. It is of course obvious that by the use of these balls 39 the post 36 will be free to rotate in either direction. This post 36 is provided with a bore 41 projecting thereinto through its lower end although this post 36 is externally threaded adjacent its lower end as indicated at 42. The stem 43 is threaded into the internally threaded bore 31 while the block 44 carried by the stem 43 is threaded or screwed into binding engagement with the supporting post 36 thus holding the post 36 to operate as a unit in conjunction with the stem 43. This stem 43 has an arm 45 projecting at right angles thereto and this arm 45 terminates in a depending portion 46 connected by the finger 16 to the rod 6 of the steering link 8. It is therefore obvious that as the rod is shifted or reciprocated in either direction the arm 45 will be swung so as to impart an oscillating movement to the stem 43 thereby in turn imparting a rotary movement to the supporting post 36. In order to yieldably retain this supporting post in a set position since the post projects for a considerable distance below the lower surface of the block 32 a nut 47 is threaded upon the externally threaded end portion 32 of the supporting post 36 and this nut 47 carries the bearing balls 48 while these bearing balls 48 are retained upon the nut 47 by means of the cap 49 fitting upon the lower end of the supporting post 36 and overhanging the periphery of the nut 47. The coil spring 50 is positioned upon the overhanging end of the supporting post 36 and this spring 50 bears at one end against the lower surface of the supporting block 32 and at its opposite end against the cap 49. It will therefore be seen that the supporting post will normally be urged downwardly although when considerable strain or stress is imparted thereto when the vehicle or automobile is passing over an uneven surface the post may move slightly upwardly although after the strain has been removed by this movement the tension of the spring 50 will again return the supporting post to its normal position.

The supporting post 36 is provided with an internally threaded bore 51 extending thereinto through the upper end and this bore 51 is provided with an enlarged threaded outer end 52. The lamp fork 53 is provided with a base 54 from which extends a lug 55 and in turn from which projects the threaded shank 56. This lug 55 fits within the threaded outer end 52 of the bore 5 while the threaded shank 56 is threaded into engagement with this bore for fixedly retaining the lamp in a set position upon the supporting post 36. It is therefore obvious that as the supporting post 36 is turned in a desired direction the rotary movement being imparted through the connection above specified to the fork upon which is carried the lamp 57 will cause the lamp to be turned so as to direct its rays directly in the path of movement of the vehicle.

It is of course obvious that the support as described in each form of the invention may be supplied to a signal lamp carried in front of a hood of a vehicle or may be carried upon each side of the vehicle as illustrated in Fig. 2.

From the foregoing description it will be seen that a very efficient head light connection has been provided for the lights of vehicles wherein when the vehicle is turned the lamps will be automatically swung so as to direct the rays of light in the path of travel of the vehicle. It will further be noted that by the support of the lamp post the lamps will be carried in their proper positions but may be freely turned with the least amount of resistance or friction, while the operation of the coil spring upon one of the posts will not only permit the lamp to turn at all times but will also permit of vertical movement of the post when the vehicle is bounding or riding unevenly over a rough surface thus relieving the strain upon the connections of the device although the lamp post will be immediately returned to its proper position by the tension of the coil spring.

What is claimed is:—

1. In a device of the class described the combination of a supporting block, a supporting post projecting through said block, means for supporting said post upon said block, means for supporting a lamp upon the upper end of said post, means for turning said post, a nut carried upon the lower end of said post, a cap carried by the lower end of said post and overhanging said nut, bearing balls interposed between said cap and said nut, and a coiled spring positioned upon said post, said spring bearing at one end upon said block and at the opposite end upon said cap whereby said post will be permitted to have limited vertical movement.

2. In a device of the class described the combination of a supporting block, a supporting post projecting through said block, means for supporting a lamp upon said post, means for forming a non-frictional support for carrying said post upon said block, said post having an internally threaded bore extending through its lower end, said post being externally threaded adjacent its end, a stem threaded into said bore, a ring, a nut extended into said stem and binding upon the end of the post, means for turning said stem whereby said post will be held to turn as a unit with said stem, a nut carried upon the threaded lower end of said post, a cap positioned upon said nut, bearing balls positioned between said cap and said nut thereby forming a non-friction connection, and a coiled spring carried upon said post and bearing at one end upon said block and at the opposite end upon said cap whereby said post will be yieldably retained in a set position so as to move in a vertical plane in a limited space.

In testimony whereof I hereunto affix my signature.

HUGH C. BISHOP.